United States Patent
Wang et al.

(10) Patent No.: US 12,478,744 B2
(45) Date of Patent: Nov. 25, 2025

(54) COVER ASSEMBLY

(71) Applicant: SHL MEDICAL AG, Zug (CH)

(72) Inventors: Hsuan Wang, Taoyuan (TW); Jared Schwartzentruber, New York, NY (US); Yun-Ting Lee, Taoyuan (TW); Michael Sonntag, Taipei (TW); Slobodan Stefanov, Deerfield Beach, FL (US); Frederick Gertz, Prosperity, SC (US)

(73) Assignee: SHL Medical AG, Zug (CH)

( * ) Notice: Subject to any disclaimer, the term of this patent is extended or adjusted under 35 U.S.C. 154(b) by 874 days.

(21) Appl. No.: 17/774,933

(22) PCT Filed: Oct. 29, 2020

(86) PCT No.: PCT/EP2020/080337
§ 371 (c)(1),
(2) Date: May 6, 2022

(87) PCT Pub. No.: WO2021/104788
PCT Pub. Date: Jun. 3, 2021

(65) Prior Publication Data
US 2022/0387728 A1  Dec. 8, 2022

Related U.S. Application Data

(60) Provisional application No. 62/940,931, filed on Nov. 27, 2019.

(30) Foreign Application Priority Data

Dec. 5, 2019  (EP) .................................... 19213904

(51) Int. Cl.
*A61M 5/32*  (2006.01)

(52) U.S. Cl.
CPC ............................... *A61M 5/3202* (2013.01)

(58) Field of Classification Search
CPC .................................................. A61M 5/3202
See application file for complete search history.

(56) References Cited

U.S. PATENT DOCUMENTS

| 2002/0004652 | A1* | 1/2002 | Asbaghi | A61B 5/153 |
| | | | | 604/242 |
| 2014/0296708 | A1* | 10/2014 | Flaherty | A61B 17/12172 |
| | | | | 604/117 |
| 2019/0192776 | A1* | 6/2019 | Alexandersson | A61M 5/326 |

FOREIGN PATENT DOCUMENTS

| CA | 2921767 A1 | 4/2015 |
| IT | 20110181 A1 | 6/2013 |

(Continued)

OTHER PUBLICATIONS

International Search Report and Written Opinion for Int. App. No. PCT/EP2020/080337, mailed Jan. 27, 2021.

*Primary Examiner* — Dung T Ulsh
(74) *Attorney, Agent, or Firm* — McDonnell Boehnen Hulbert & Berghoff LLP

(57) ABSTRACT

A cover assembly that covers a medicament delivery member of a medicament container. The assembly having a housing extending along a longitudinal axis, a proximal end and a distal end. A cover member bi-directionally movable along the longitudinal axis relative to the housing, where the cover member has a tubular portion arranged to protrude from the proximal end of the housing, a biasing element arranged between the housing and the cover member configured to move the cover member, a locking member having a fixed end which is pivotally arranged to the housing and a free end which is releasably connected to the cover member. The cover assembly also has an actuator unit connected to the housing configured to interact with the free end of the (Continued)

locking member such that the locking member is able to lock and unlock the cover member in different positions.

20 Claims, 9 Drawing Sheets

(56) References Cited

FOREIGN PATENT DOCUMENTS

| | | |
|---|---|---|
| WO | 2016/087219 A1 | 6/2016 |
| WO | 2018/192750 A1 | 10/2018 |

\* cited by examiner

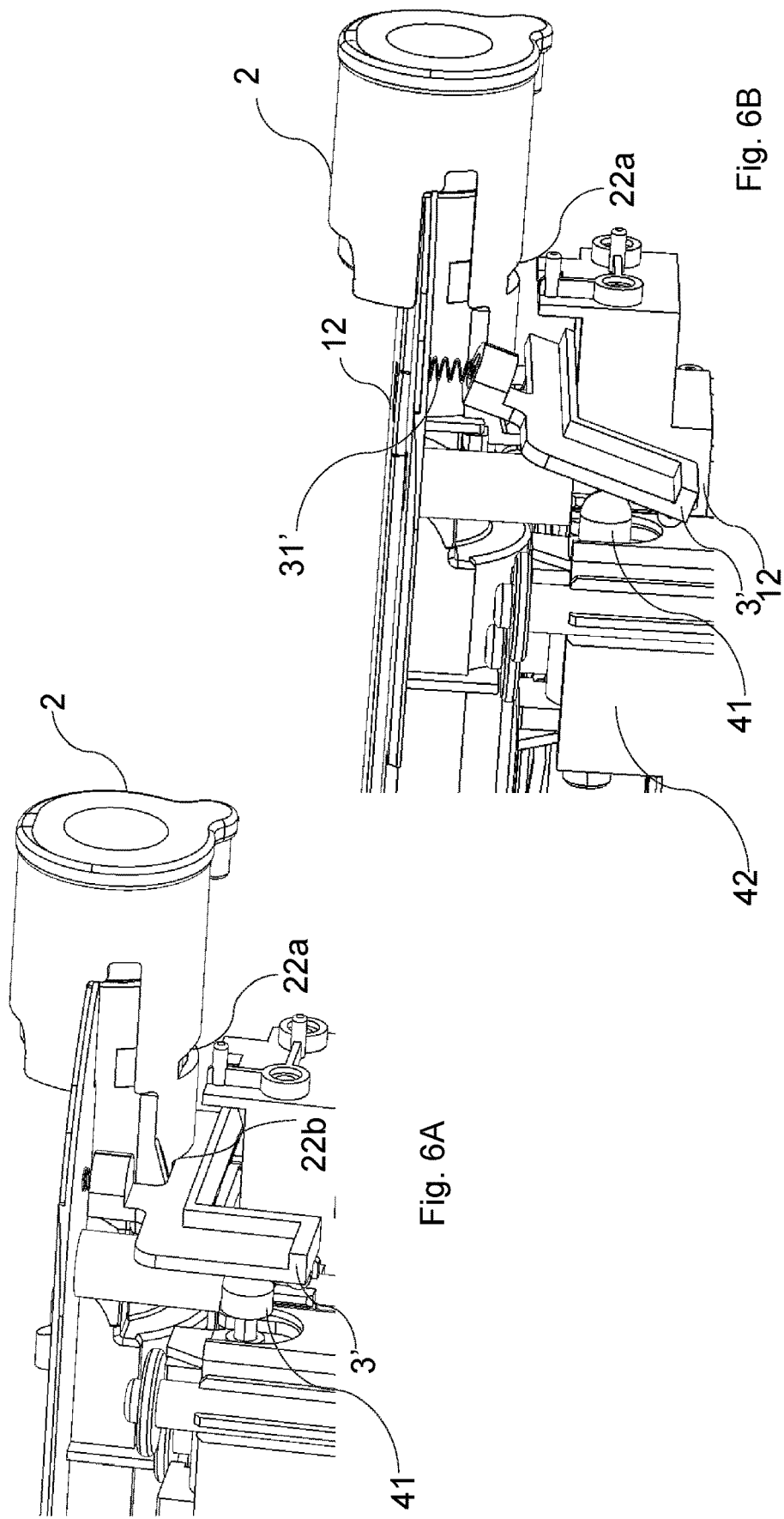

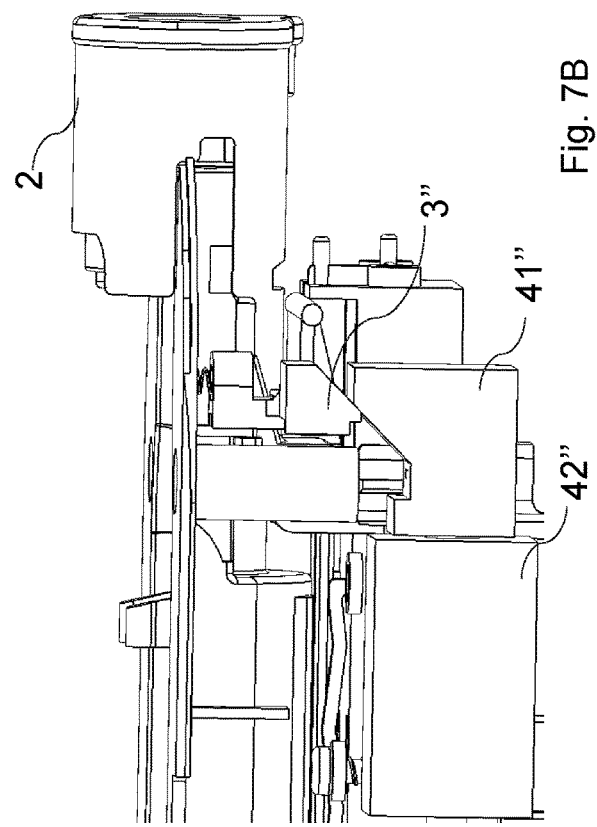
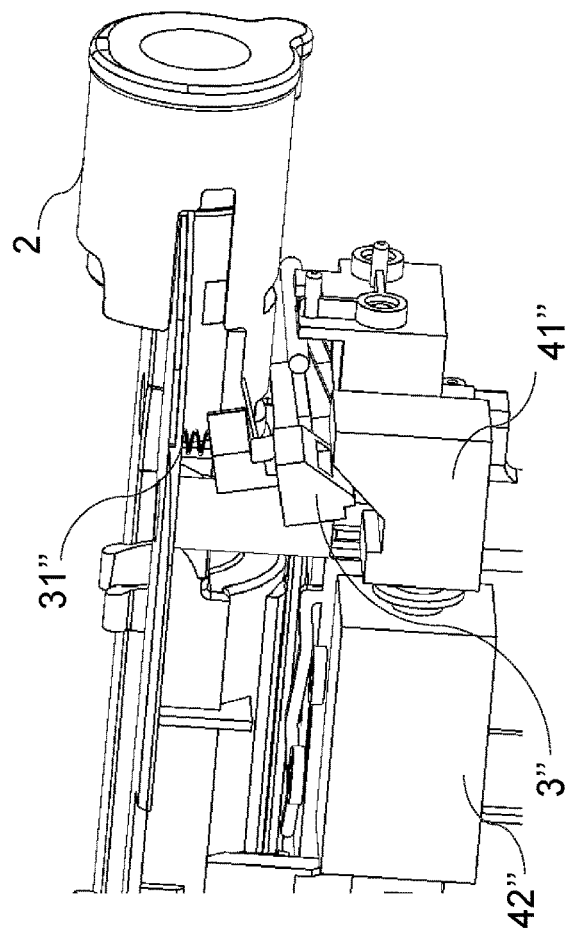
Fig. 7A
Fig. 7B

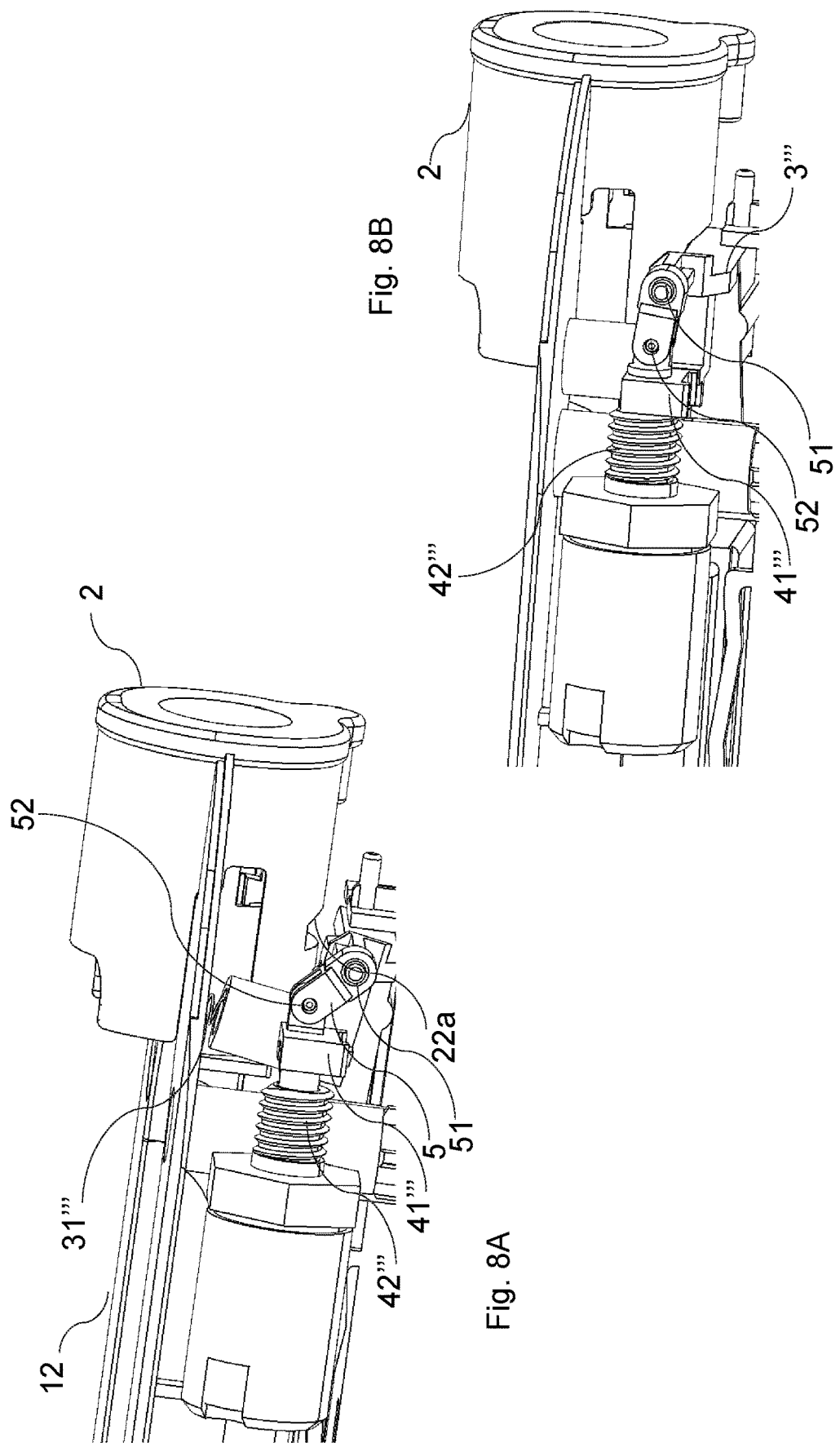

COVER ASSEMBLY

CROSS REFERENCE TO RELATED APPLICATIONS

The present application is a U.S. National Phase Application pursuant to 35 U.S.C. § 371 of International Application No. PCT/EP2020/080337 filed Oct. 29, 2020, which claims priority to U.S. Provisional Patent Application No. 62/940,931 filed Nov. 27, 2019, and European Patent Application No. 19213904.6 filed Dec. 5, 2019. The entire disclosure contents of these applications are herewith incorporated by reference into the present application.

TECHNICAL FIELD

The present disclosure relates to a cover assembly for covering a medicament delivery member of a medicament container and more particularly to a cover assembly for a medicament delivery device. The cover assembly is adapted to avoid accidental access of the medicament delivery member before and after the operation of a medication delivery in a medicament delivery device.

BACKGROUND

Medicament delivery devices such as auto-injectors, pen-injectors, inhalers, on-body devices are generally known for the self administration of a medicament by patients without formal medical training. As an example, patients suffering from diabetes may require repeated injections of insulin. Other patients may require regular injections of other types of medicaments, such as growth hormones and biologic/biosimilar medicaments. Reusable auto-injectors are commonly used for those patients who require repeated injections.

To prevent accidental injuries, most medicament delivery devices in the market are provided with a cover member configured to bi-directionally move in relation to a delivery member, so as to cover the delivery member, e.g. needle, catheter or nozzle; before and after the operation of medicament delivery devices, the bi-directional movement of cover members will usually be restricted after the operation of medicament delivery devices, so that infection by accessing delivery members will also be prevented. However, most cover members for medicament delivery devices are designed with an irreversible lock to restrict the bi-directional movement after the operation of medicament delivery devices, which makes it difficult to apply this to a reusable/resettable or multi-used medicament delivery device or a training/simulation medicament delivery device. To introduce cover members to reusable devices, a disposable cassette with the irreversible cover member lock or a reversible cover member lock is demanded.

WO2016/087219 disclosed a cover assembly for an injection device; the cover assembly comprises a needle guard movable with respect to a housing of the injection device, between a first operating position, which the needle guard surrounds an injection needle and a second position, which the injection needle is exposed. The cover assembly further comprises an electromagnetic lock configured to reversibly restrict and release the movement of the needle guard. The needle guard can be locked and prevented from retracting in relation to the housing under an impact of the electromagnet, so that the injection needle of a medicament container will be covered after the end of injection; and can be released for carrying out the next injection sequence.

However, the cover assembly in WO2016/087219 uses the electromagnetic force to block the retraction movement of the needle guard directly, to safely lock the needle guard, the electromagnetic force has to be high enough to prevent the retraction movement of the needle guard when a user pushes on the needle guard, which means a high consumption of the electric power to create a high electromagnet force is required.

SUMMARY

An object of the present disclosure is to provide a more robust and reliable cover assembly and more particularly for a reusable medicament delivery device, which avoids the problems of the prior art.

In the present disclosure, when the term "distal" is used, this refers to the direction pointing away from the dose delivery site. When the term "distal part/end" is used, this refers to the part/end of the delivery device, or the parts/ends of the members thereof, which under use of the medicament delivery device is/are located furthest away from the dose delivery site. Correspondingly, when the term "proximal" is used, this refers to the direction pointing to the dose delivery site. When the term "proximal part/end" is used, this refers to the part/end of the delivery device, or the parts/ends of the members thereof, which under use of the medicament delivery device is/are located closest to the dose delivery site.

Further, the term "longitudinal", "longitudinally", "axially" or "axial", refers to a direction extending from the proximal end to the distal end and along the device or components thereof in the direction of the longest extension of the device and/or component.

Similarly, the terms "traverse", "transversal", "transversally" refers to a direction generally perpendicular to the longitudinal direction.

An object of this disclosure is provide a simple and reliable way of covering a delivery member of a medicament container and more particularly, a lock for locking the cover assembly in the cover position, in which the delivery member of a medicament container is completely surrounded by the cover assembly.

According to an aspect of the present disclosure, the object is achieved by a robust and reliable cover assembly according to claim 1.

There is hence provided a cover assembly for covering a medicament delivery member of a medicament container, comprising: a housing extending along a longitudinal axis and having a proximal and a distal end; a cover member bi-directionally movable along the longitudinal axis and in relation to the housing and wherein said cover member comprises a tubular portion arranged to protrude from the proximal end of the housing; a biasing element arranged between the housing and the cover member and configured to move the cover member; a locking member having a fixed end which is pivotally arranged to the housing and a free end which is releasably connected to the cover member; wherein that the cover assembly further comprises: an actuator unit connected to the housing and configured to interact with the free end of the locking member such that the locking member is able to lock and unlock the cover member in different positions.

According to one embodiment, the actuator unit comprises a movable element connected to the locking member.

According to one embodiment, the locking member is resiliently arranged in relation to the housing through a resilient member which is arranged between the housing and the locking member.

According to one embodiment, the cover member comprises a first and a second locking element configured to interact with a counter-locking element arranged on the free end of the locking member.

According to one embodiment, the cover member is arranged to be in a locked retracted position in which the tubular portion of the cover member is partially arranged within the housing and the movable element of the actuator unit is extended exerting a force on the free end of the locking member such that the counter locking element and the first locking element are engaged.

According to one embodiment, the cover member is arranged to be in an unlocked extended position in which the tubular portion of the cover member is protruding a predetermined distance from the proximal end of the housing and the movable element of the actuator unit is retracted without exerting a force on the free end of the locking member such that the counter locking element and the first locking element are disengaged.

According to one embodiment, the cover member is arranged to be moved by the biasing element from the locked start position to the unlocked extended position.

According to one embodiment, the cover member is arranged to be in a locked extended position in which the tubular portion of the cover member is protruding the predetermined distance from the proximal end of the housing and the rod of the actuator unit is extended exerting a force on the free end of the locking member such that the counter locking element and the second locking element are engaged.

According to one embodiment, the housing comprises a proximal stop element configured to interact with a counter-acting stop element of the cover member for stopping the movement of the cover member from the locked start position to the unlocked extended position.

According to one embodiment, the actuator unit comprises an electromagnet element, more particularly a solenoid for moving the movable element.

According to one embodiment, the actuator unit comprises a biasing force member for moving the movable element.

According to one embodiment, the biasing force member can be a mechanical forcing member, such as a spring or a flexible arm; or a electrical forcing member, such as an electric motor.

According to one embodiment, the cover assembly is used in a medicament delivery device.

According to one embodiment, the cover assembly is used in a simulation device of a medicament delivery device with a dummy needle, such device can be used to train a user to use the medicament delivery device.

According to one embodiment, the medicament delivery device can be an injection device, a jet injection device, an insulin pump, an on-body device, an inhalation device or a nasal spryer.

According to one embodiment, the medicament delivery device or the training device of a medicament delivery device comprises a battery and a control circuit.

According to one embodiment, the actuator unit is connected to the battery and the control circuit of the medicament delivery device or the training device of a medicament delivery device.

According to one embodiment, the medicament delivery device comprises a movable medicament container along the axis in relation to the housing and a power pack configured to move the medicament container in different positions.

According to one embodiment, the medicament container comprises a medicament delivery member, which is covered by the cover member in all position of the medicament delivery device before or after the medicament delivery operation.

According to one embodiment, the medicament delivery member can be fixedly arranged on the proximal portion of the medicament container; or as a separate component associates with the medicament container during the medicament delivery operation.

Other aspects, features, and advantages will be apparent from the summary above, as well as from the description that follows, including the figures and the claims.

Generally, all terms used in the claims are to be interpreted according to their ordinary meaning in the technical field, unless explicitly defined otherwise herein. All references to "a/an/the element, apparatus, component, means, etc. are to be interpreted openly as referring to at least one instance of the element, apparatus, component, means, etc.", unless explicitly stated otherwise.

BRIEF DESCRIPTION OF THE DRAWINGS

The specific embodiments of the inventive concept will now be described, by way of example, with reference to the accompanying drawings, in which:

FIG. 6A-6B display the cover assembly of FIG. 1 in a third embodiment.

FIG. 7A-7B display the cover assembly of FIG. 1 in a fourth embodiment.

FIG. 8A-8B display the cover assembly of FIG. 1 in a fifth embodiment.

DETAILED DESCRIPTION

The inventive concept will now be described more fully hereinafter with reference to the accompanying drawings, in which exemplifying embodiments are shown. The inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description.

Figure 1:
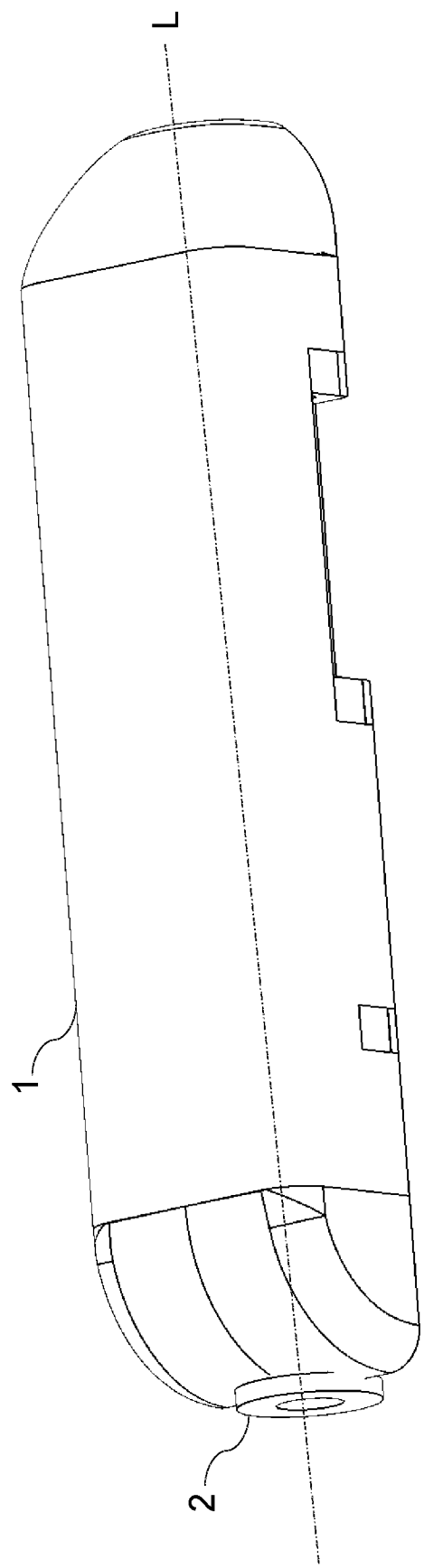
FIG. 1 displays a cover assembly arranged with a medicament delivery device.
Figure 2:
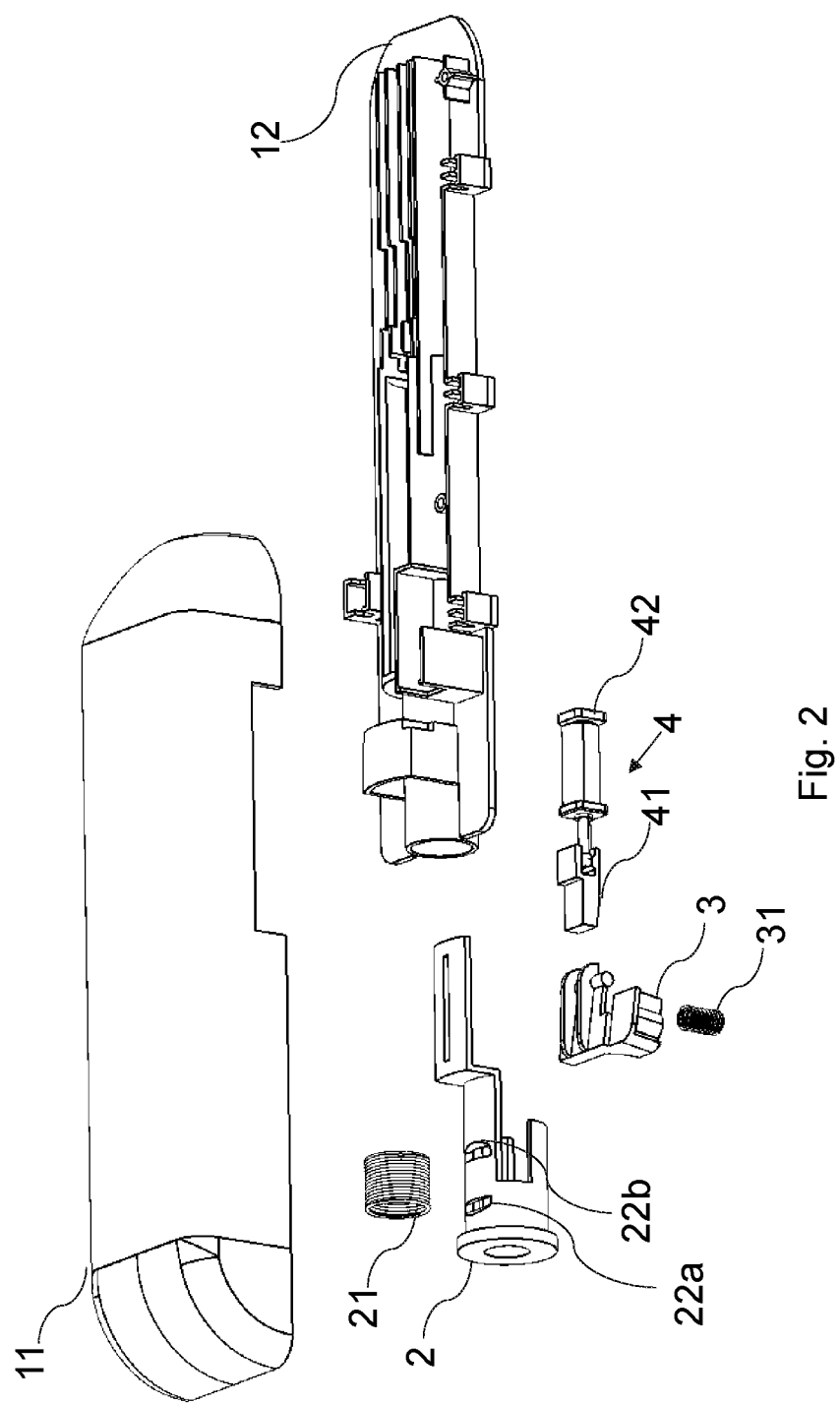
FIG. 2 displays the cover assembly of FIG. 1 in a first embodiment.

FIG. 1-2 illustrate a first embodiment of a cover assembly comprises a housing (1) extending along a longitudinal axis (L) and having a proximal and a distal end. A cover member (2) bi-directionally movable along the longitudinal axis (L) and in relation to the housing (1). The housing (1) may further comprise a housing case (11) and a housing base (12); the cover member (2) comprises a tubular portion configured to be partially received in the housing (1) and movable in relation to the housing (1) under a biasing force from a biasing element (21); which biasing element is arranged between the cover member (2) and the housing (1). The cover assembly further comprises a locking member (3) having a fixed end which is pivotally arranged to the housing (1), a free end which is releasably connected to the cover member (2), and a resilient member (31) e.g. a spring or flexible arm. The resilient member is arranged between the free end of the locking member and the housing (1) and is configured to bias the free end of the locking member which is pivotally moved in relation to the housing (1). The free end of the locking member (3) comprises a counter locking element, preferably, a ledge; configured to engage with a first locking element (22a) and a second locking element (22b) arranged on the cover member (2) when the free end of the locking member (3) is moved radially inwards in relation to the longitudinal axis (L). The first locking element (22a) is configured to lock the cover member (2) in a retracted position when the cover member (2) is retracted into the housing case (11), such that a delivery member of the medicament delivery device may be exposed. The second locking element (22b) is configured to lock the cover member (2) in an extended position when the cover member (2) is extended from the housing case (11), such that the delivery member can be completely covered by the cover member (2). The first locking element (22a) is an optional feature, which can be removed when the cover assembly is used in a medicament delivery device that the end user usually is required to manually press the cover member (2) during an operation of the medicament delivery sequence.

The cover assembly also comprises an actuator unit (4) which is arranged to the housing and comprises a movable element (41), preferably a rod; and a sleeve (42); the movable element (41) is axially movable in relation the sleeve (42) and is at least partially made of magnetic elements, such as iron, nickel or cobalt; or an alloy which comprises the magnetic elements; or plastic which comprises the magnetic elements. The actuator unit (4) further comprises a biasing force member, preferably, arranged in the sleeve (42) for moving the movable element (41) in relation to the sleeve (42). The actuator unit (4) further comprises an electromagnetic element, more particularly a solenoid, connected to an electronic circuit with a battery and arranged in the sleeve (42) surrounding a portion of the movable element (41) for moving the movable element (41) once a current is flowing on the solenoid.

In the first embodiment, the actuator unit (4) is arranged along the longitudinal axis (L), such that the movable element (41) is axially movable along the longitudinal axis (L). The moving direction of the movable element (41) under the mechanical force of the biasing force member is opposite to the moving direction of the moveable element (41) under the magnetic force of the solenoid. The movable element (41) is moved out from the sleeve (42) under the mechanical force of the biasing force member, so that the proximal end of the movable element (41) will bias the free end of the locking element (3) inwardly towards the longitudinal axis and against the force of the biasing element (31). The counter locking element is therefore engaged with the first or the second locking element to lock the cover member (2) in either the retracted position or the extended position. Once the current is flowing on the solenoid, the movable element (41) is pulled close to or into the sleeve (42) under the magnetic force of the solenoid, such that the movable element (41) is moving away from the free end of the locking member (3). Therefore, the free end of the locking member (3) is biased radially outwards in relation to the longitudinal axis (L) under the force of the resilient member (31) and the counter locking element is released from the first or the second locking element. The cover member (2) is therefore free to move axially in relation to the housing (1).

Figure 3B:
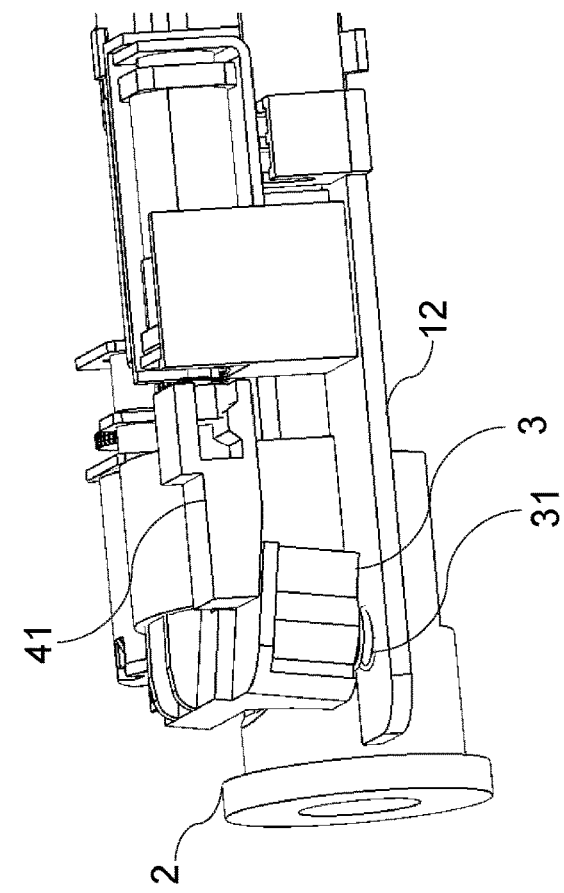
FIG. 3A-3B display the cover assembly of the first embodiment in a retracted position.
Figure 3A:
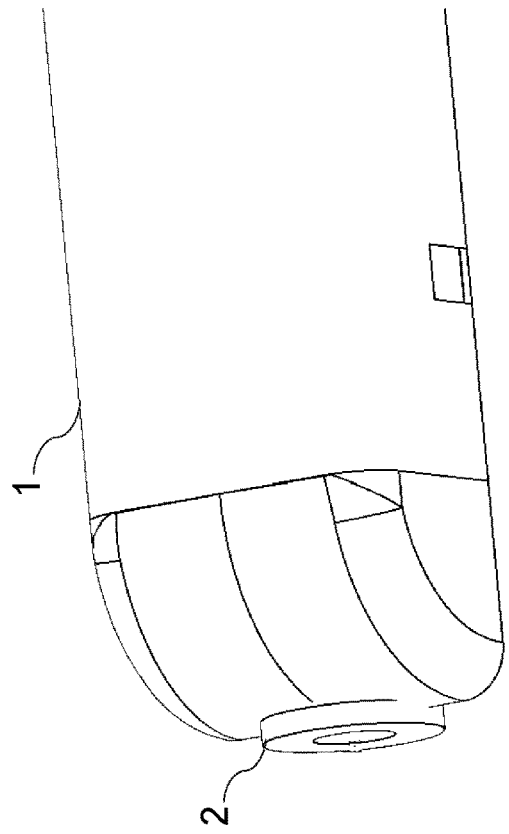
Figure 4B:
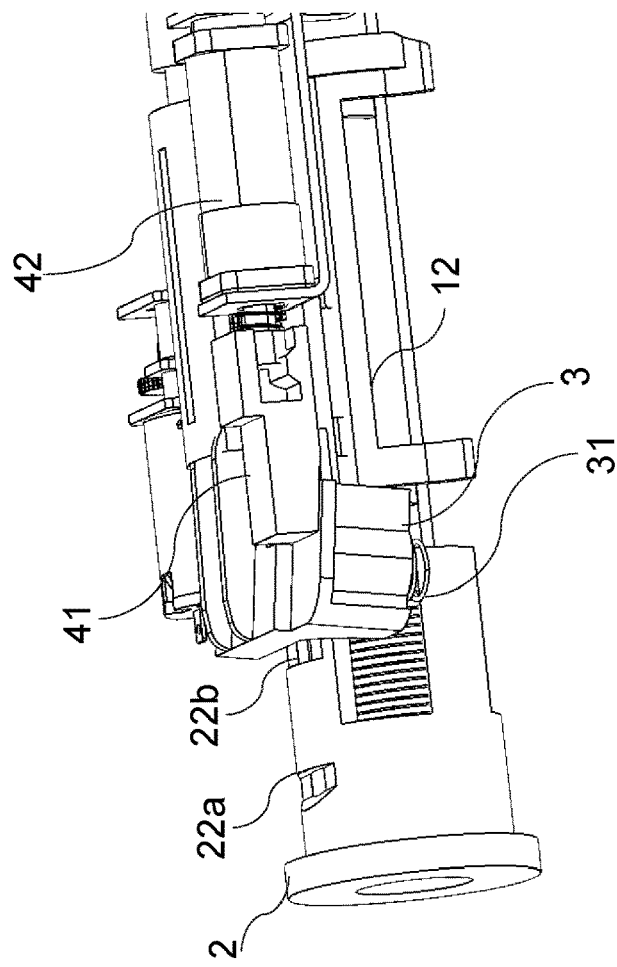
FIG. 4A-4B display the cover assembly of the first embodiment in an extended position.
Figure 4A:
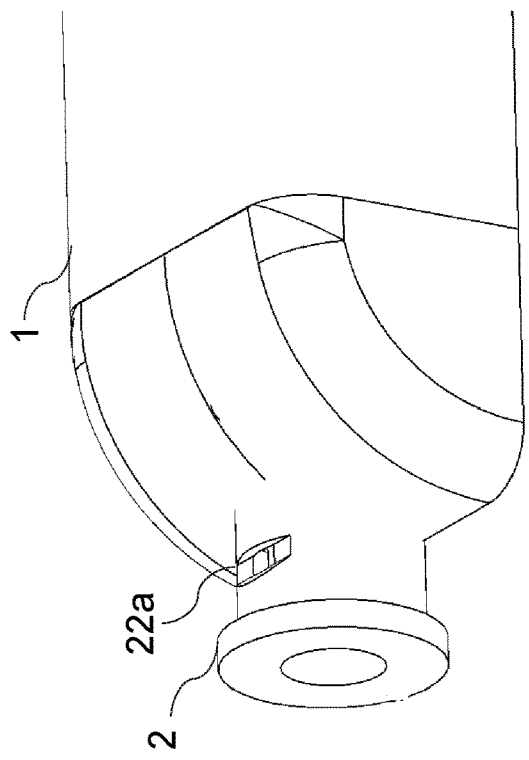

FIG. 3A-3B illustrate the cover member (2) arranged in a retracted position, in which the tubular portion of the cover member (2) is received in the housing (1), and FIG. 4A-4B illustrate the cover member (2) arranged in an extended position, in which the tubular portion of the cover member (2) is protruding a predetermined distance from the proximal end of the housing (1).

Figure 5B:
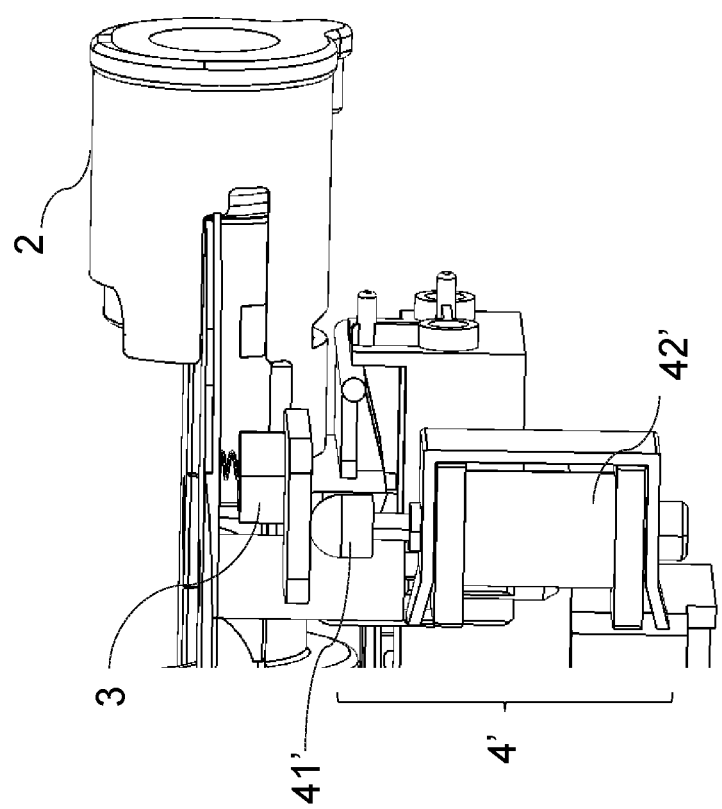
FIG. 5A-5B display the cover assembly of FIG. 1 in a second embodiment.
Figure 5A:
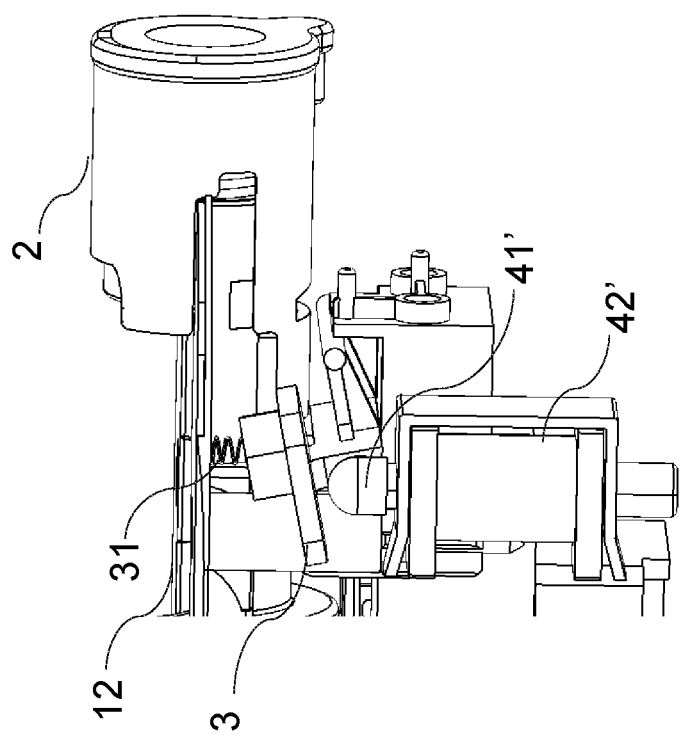

FIG. 5A-5B illustrate a second embodiment of the cover assembly. The arrangement of the cover assembly in the second embodiment is mainly the same as the arrangement of the cover assembly described in the first embodiment. The actuator unit (4') in the second embodiment is transversely arranged in relation to the longitudinal axis (L); therefore, the movable element is transversely movable in relation to the longitudinal axis (L).

To lock the cover member (2) in either the retracted or the extended position, the mechanism can be performed as in the first embodiment. The movable element (41') is moved out from the sleeve (42') under the mechanical force of the biasing force member, such that the proximal end of the movable element (41') will bias the free end of the locking element (3) inwardly towards the longitudinal axis and against the force of the biasing element (31). The biasing element (31) can be a compression spring or a tension spring. The counter locking element is therefore engaged with the first or the second locking element to lock the cover member (2) in either the retracted position or the extended position. Once the current is flowing on the solenoid, the movable element (41') is pulled close to or into the sleeve (42') under the magnetic force of the solenoid, such that the movable element (41') is moving away from the free end of the locking member (3). Therefore, the free end of the locking member (3) is biased radially outward in relation to the longitudinal axis (L) under the force of the resilient member (31) and the counter locking element is released from the first or the second locking element. The cover member (2) is therefore free to move axially in relation to the housing (1).

FIG. 6A-6B illustrate a third embodiment of the cover assembly. The arrangement of the cover assembly in the third embodiment is mainly the same as the arrangement of the cover assembly described in the first embodiment. The locking member (3') in the third embodiment comprises a fixed end which is pivotally arranged to the housing (1), the fixed end is preferably arranged on the middle portion of the locking member (3'). The locking member (3') also comprises a free end, which is releasably connected to the cover member (2). The free end comprises a counter locking element, preferably a ledge, configured to releasably engage with the first and the second locking element on the cover member (2). A resilient member (31') is positioned between the housing base (12) and a portion of the free end. The resilient member (31') is configured to bias the free end and move the counter locking element out from the engagement with either the first or the second locking element of the cover member (2). The locking member (3') further comprises a second free end oppositely arranged in relation to the free end with the counter locking element, such that the free end and the second free end formed the two ends of a see-saw structure that the fixed end acted as the pivot.

To lock the cover member (2) in either the retracted or the extended position, the mechanism of the actuator unit (4) can be performed as in the first embodiment. The movable element (41) is moved out from the sleeve (42) under the mechanical force of the biasing force member, such that the proximal end of the movable element (41) will bias the second free end of the locking element (3') along the longitudinal axis (L). Due to the see-saw structure between the free end and the second free end, once the second free end of the locking element (3') is moved along the longitudinal axis (L), the free end of the locking element (3') is also pivotally moved in relation to the housing (1), such that the biasing element (31') is compressed and the counter locking element on the free end is engaged with either the first or the second locking element of the cover member (2) in either the retracted position or the extended position. Once the current is flowing on the solenoid, the movable element (41) is pulled close to or into the sleeve (42) under the magnetic force of the solenoid, such that the movable element (41) is moved away from the second free end of the locking member (3) as shown in the FIG. 6B. Since the second free end is free to move, the free end of the locking member (3') is therefore transversely biased in relation to the longitudinal axis (L) under the force of the resilient member (31') and the counter locking element is released from the first or the second locking element. The cover member (2) is therefore free to move axially in relation to the housing (1).

FIG. 7A-7B illustrate a fourth embodiment of the cover assembly. The arrangement of the cover assembly in the fourth embodiment is basically the same as the arrangement of the cover assembly described in the first embodiment. The free end of the locking element (3") as described in the first embodiment, further comprises a flipped surface, preferably a wedge surface. The movable element (41") of the actuator unit (4") comprises a flipper surface, preferably a counter wedge surface. The flipper surface is configured to be in contact with the flipped surface, such that when the movable element (41") is pulled into the sleeve (42) under the magnetic force of the solenoid, the movable element (41") moves the free end of the locking element (3") against the biasing force of the resilient member (31") through engagement of the flipper surface and the flipped surface. In the fourth embodiment of the disclosure, when the movable element (41") is moved out from the sleeve (42) under the mechanical force of the biasing force member, the flipper surface on the movable element (41") is moved out from supporting the flipped surface of the free end of the locking element (3") against the biasing force from the resilient member (31"), such that the counter locking element is moved out from the engagement with either the first or the second locking element of the cover member (2). The cover member (2) is therefore free to move axially in relation to the housing (1).

To lock the cover member (2) in either the retracted or the extended position, the movable element (41") is pulled into the sleeve (42") under the magnetic force of the solenoid. The movable element (41") moves the free end of the locking element (3") against the biasing force of the resilient member (31") through engagement of the flipper surface and the flipped surface as shown in FIG. 7B, such that the counter locking element on the free end is engaged with either the first or the second locking element of the cover member (2) in either the retracted position or the extended position.

Figure 10:
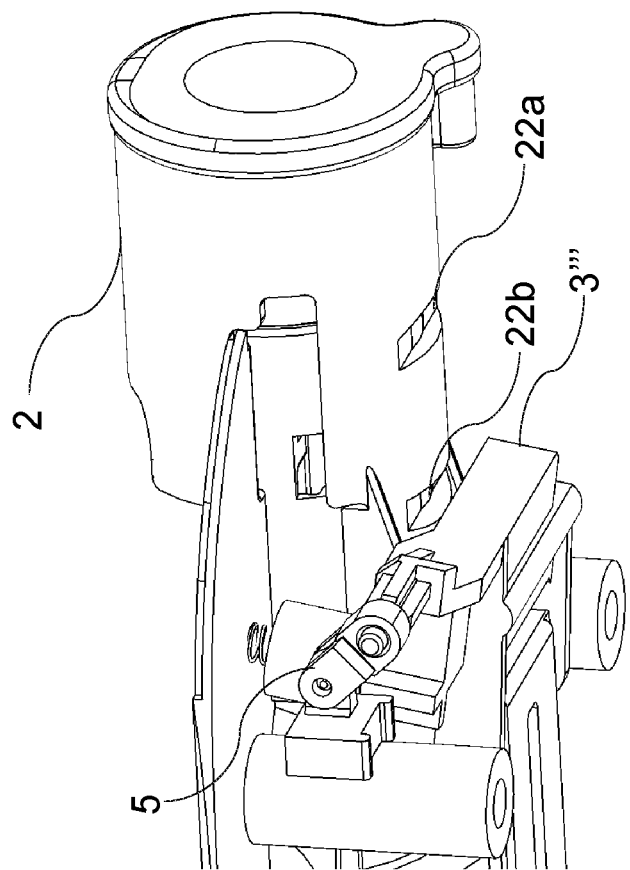
FIG. 9-10 display the locking element of the cover assembly of in the fifth embodiment.
Figure 9:
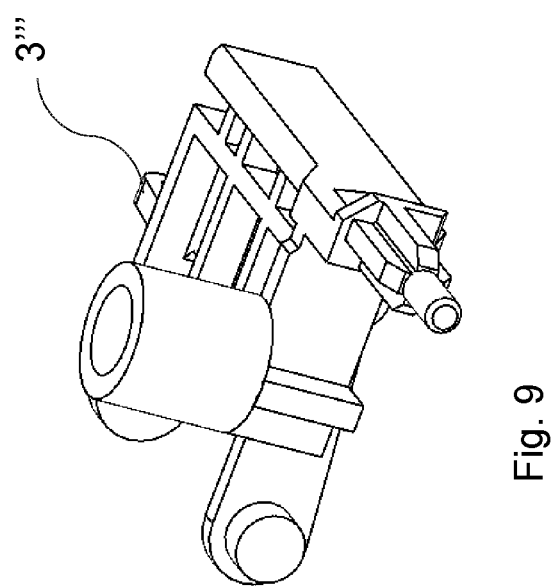

FIG. 8A-8B illustrate a fifth embodiment of the cover assembly. The arrangement of the cover assembly in the fifth embodiment is basically the same as the arrangement of the cover assembly described in the first embodiment. In the fifth embodiment, a connector (5) is arranged to connect the movable element (41''') and the locking member (3'''). The locking member (3'''), as shown in FIG. 9-10, is arranged with a fixed end pivotally arranged with the housing base (12), a free end arranged to releasably connect to the cover member (2) and a resilient member (31''') is arranged between the housing base (12) and a portion of the free end and arranged to facilitate the transversal movement of the free end of the locking member (3') to disengage with the cover member (2). The free end comprises a counter locking element configured to releasably engage with either the first (22a) or the second (22b) locking element of the cover member (2). The proximal tip of the free end is arranged to pivotally connect with the connector (5) at a first end (51) of the connector (5). The proximal tip of the movable element (41''') is also arranged to pivotally connect with the connector (5) at a second end (52) of the connector (5); such that the first end (51) of the connector (5) is able to follow the transverse movement together with the free end of the locking member (3'''); and the second end (52) of the connector (5) is able to follow the axial movement together with the movable element (41''').

Since the length of the connector (5) is fixed, but the axial distance between the proximal tip of the movable element (41''') and the proximal tip of the free end of the locking member (3''') is variable, due to the movable element (41') being axially movable in relation to the housing base but the locking member (3''') being axially fixed to the housing base (12), when the movable element (41''') is proximally moved, the distance between the proximal tip of the movable element (41') and the proximal tip of the free end of the locking member (3''') will be shortened. The connector (5) will therefore diagonally extend in relation to the longitudinal axis (L) as shown in FIG. 8A. On the other hand, when the movable element (41''') is distally moved, the distance between the proximal tip of the movable element (41''') and the proximal tip of the free end of the locking member (3') will be extended. The connector (5) will therefore move pivotally in relation to the second end (52) and be axially stretched along the longitudinal axis (L). The pivotal movement of the connector (5) causes the free end of the locking member (3''') to transversely move in relation to the longitudinal axis (L) together with the first end (51) of the connector (5), as shown in FIG. 8B To lock the cover member (2) in either the retracted or the extended position, the movable element (41') is pulled into the sleeve (42') under the magnetic force of the solenoid. The distal movement of the second end (52) of the connector (5) together with the movable element (41''') causes the pivotal movement of the connector (5) around the second end (52) and further causes the transversal movement of the free end of the locking member (3') together with the first end (51) of the connector (5) in relation to the longitudinal axis (L) against the biasing force of the resilient member (31') as shown in FIG. 8B, such that the counter locking element on the free end is engaged with either the first or the second locking element of the cover member (2) in either the retracted position or the extended position.

To unlock the cover member (2), the power supply to the solenoid should be shut off, and once the current flow on the solenoid is dismissed, the movable element (41''') is proximally moved under the mechanical force of the biasing force member. The proximal movement of the movable element (41''') shortens the distance between the proximal tip of the movable element (41''') and the proximal tip of the free end of the locking element (3'''). The connector (5) is therefore rotating clockwise around the second end (52), preferably between 5 to 45 degrees, such that the connector (5) is diagonally extending in relation to the longitudinal axis (L), and the first end (51) of the connector (5) is transversely moved in relation to the longitudinal axis (L). Such that the free end of the locking element (3''') is thereby moved transversely away in relation to the longitudinal axis and the counter locking element arranged on the free end of the locking element (3''') is therefore disengaged with either the first or the second locking element of the cover member (2), as shown in FIG. 8A.

Since the transversal movement of the free end of the locking element (3''') is controlled by the axial movement of the movable element (41''') and the connector (5) as described above, the resilient member (31''') can be removed from the fifth embodiment.

The direction of the mechanical force of the biasing force member and the magnetic force of the solenoid can be interchangeably arranged in all described embodiments.

The cover member (2) may be arranged in an initial locked start and retracted position; so that when the cover assembly used in a medicament delivery device, a medicament delivery member can be attached to the medicament delivery device. Once the medicament delivery member is attached on the medicament delivery device, and the electronic circuit is switched, a current flow on the solenoid is changed; therefore the free end of the locking member (3; 3'; 3''; 3''') is biased under the biasing force of the resilient member (31) and the counter locking element on the locking member (3) and the first locking element (22a) are disengaged.

When the counter locking element on the locking member (3) and the first locking element (22a) are disengaged, the cover member (2) is moved proximally under the biasing force of the biasing element (21) to the extended position, so that the medicament delivery member is covered. The housing (1) comprises a proximal stop element configured to interact with a counter-acting stop element of the cover member (2) for stopping the movement of the cover member from the locked start position to an unlocked extended position.

It should be noted that, alternatively, the proximal stop element can be arranged on an independent element which is axial and rotational fixedly attachable to the housing.

Further, the resilient member (31; 31'; 31''; 31''') can be a compression spring, a tension spring or a flexible arm; such as it can also be arranged between the free end of the locking element and the outer surface of the sleeve.

The cover member (2) is moved to the retracted position in relation to the housing (1) during a medicament delivery operation by a user, so that the medicament delivery member is exposed. The cover member (2) may be locked in the retracted position as described above until the medicament delivery operation is completed.

As shown in FIG. 4A-4B, after the medicament delivery operation is completed, the cover member is moved to the extended position under the biasing force of the biasing element (21) and covers the medicament delivery member and the electronic circuit may be switched off. Once the electronic circuit is switched again, the current flow on the solenoid is changed again. Therefore, the free end of the locking member (3; 3'; 3''; 3''') and the counter locking element of the locking member (3; 3'; 3''; 3''') and the second locking element (22b) are engaged, and the cover member (2) is in the locked extended position to cover the medicament delivery member.

The medicament delivery device may further comprise a movable medicament container along the longitudinal axis (L) in relation to the housing (1) and a power pack configured to move the medicament container in different positions. In this embodiment, the medicament container may be fixedly arranged with the medicament delivery member and configured to be completed hidden in the housing (1) in the initial position, and moved proximally after the cover member (2) is in the unlocked extended position. So that, except during the medicament delivery operation, the medicament delivery member is covered by the cover member (2) in all positions of the medicament delivery device.

The medicament delivery device may be a reusable device, so that after the medicament delivery sequence is completed and the cover member (2) is locked in the extended position, through the mechanism of the disclosure as described in any one of the all embodiments, the medicament container and the delivery member can be removed.

It should be noted that, the second locking element (22a) is an optional design. This design directed to lock the cover member (2) in the retracted position, and since this feature is design for replacing a delivery member, such as a pen needle; or as an indication to indicate a medicament delivery device is ready to be used; or facilitating the medicament delivery operation. The mechanism of the present disclosure as described in any one of the all embodiments without the design of the second locking element (22a) can be used in a medicament delivery device that is not requiring those mentioned functions.

The inventive concept has mainly been described above with reference to a few examples. However, as is readily appreciated by a person skilled in the art, other embodiments than the ones disclosed above are equally possible within the scope of the inventive concept, as defined by the appended claims.

The invention claimed is:

1. A cover assembly for covering a medicament delivery member of a medicament container, comprising:
    a housing extending along a longitudinal axis and having a proximal end and a distal end;
    a cover member bi-directionally movable along the longitudinal axis and in relation to the housing and wherein said cover member comprises a tubular portion arranged to protrude from the proximal end of the housing;
    a biasing element arranged between the housing and the cover member and configured to move the cover member;
    a locking member having a fixed end which is pivotally arranged to the housing and a free end which is releasably connected to the cover member,
    wherein the cover assembly further comprises:
    an actuator unit connected to the housing and configured to interact with the free end of the locking member such that the locking member is able to lock and unlock the cover member in different positions.

2. A cover assembly according to claim 1, wherein the actuator unit comprises a movable element connected to the locking member.

3. A cover assembly according to claim 2, wherein the locking member is resiliently arranged in relation to the housing through a resilient member which is arranged between the housing and the locking member.

4. A cover assembly according to claim 1, wherein the cover member comprises a first and a second locking element configured to interact with a counter-locking element arranged on the free end of the locking member.

5. A cover assembly according to claim 4, wherein the cover member is arranged to be in a locked retracted position in which the tubular portion of the cover member is partially arranged within the housing and the movable element of the actuator unit is extended exerting a force on the free end of the locking member such that the counter locking element and the first locking element are engaged.

6. A cover assembly according to claim 4, wherein the cover member is arranged to be in an unlocked extended position in which the tubular portion of the cover member is protruding a predetermined distance from the proximal end of the housing and the movable element of the actuator unit is retracted without exerting a force on the free end of the locking member such that the counter locking element and the first locking element are disengaged.

7. A cover assembly according to claim 6, wherein the cover member is arranged to be moved by the biasing element from the locked start position to the unlocked extended position.

8. A cover assembly according to claim 7, wherein the cover member is arranged to be in a locked extended position in which the tubular portion of the cover member is protruding the predetermined distance from the proximal end of the housing and the movable element of the actuator unit is extended exerting a force on the free end of the locking member such that the counter locking element and the second locking element are engaged.

9. A cover assembly according to claim 1, wherein the housing comprises a proximal stop element configured to interact with a counter-acting stop element of the cover member for stopping the movement of the cover member from the locked start position to the unlocked extended position.

10. A cover assembly according to claim 4, wherein the actuator unit comprises an electromagnet element, more particularly a solenoid for moving the movable element.

11. A cover assembly according to claim 1, wherein the actuator unit comprises a biasing force member for moving the movable element.

12. A medicament delivery device comprising;
a cover assembly according to claim 1; and
a medicament container positioned with the housing.

13. A medicament delivery device according to claim 12, where the medicament container is movable along the axis in relation to the housing and a power pack configured to move the medicament container in different positions.

14. A medicament delivery device according to claim 13, wherein the medicament container comprises a medicament delivery member, which is covered by the cover member in all position of the medicament delivery device.

15. A medicament delivery device according to claim 12, wherein the medicament delivery device is a medicament injector.

16. A cover assembly for covering a medicament delivery member of a medicament container, comprising:
a housing having a longitudinal axis, a proximal end and a distal end;
a cover member axially movable relative to the housing and comprising a tubular portion that protrudes from the proximal end of the housing;
a biasing element positioned between the housing and the cover member such that the cover member is biased in a proximal direction;
a locking member comprising a fixed end pivotally arranged to the housing and a free end releasably connected to the cover member;
a resilient member operatively engaged with the locking member and the housing; and
an actuator unit connected to the housing and operatively engaged with the free end of the locking member to lock and unlock the cover member in different axial positions relative to the housing.

17. A cover assembly according to claim 16, wherein the cover member further comprises a first and a second locking element that interacts with a counter-locking element on the free end of the locking member, where the counter locking element is released from the first or the second locking element by a radial force exerted by the resilient member.

18. A cover assembly according to claim 16, wherein the actuator unit comprises a movable element connected to the locking member.

19. A cover assembly according to claim 16, wherein the resilient member exerts a force that biases the locking member radially outwards in relation to the longitudinal axis.

20. A cover assembly according to claim 16, wherein the housing comprises a proximal stop element configured to interact with a counter-acting stop element of the cover member for stopping the movement of the cover member from a locked start position to a unlocked extended position.

* * * * *